(12) United States Patent
Odobetskiy et al.

(10) Patent No.: US 11,475,407 B2
(45) Date of Patent: Oct. 18, 2022

(54) SYSTEM AND METHOD FOR PROVIDING A GRAPHICAL USER INTERFACE

(71) Applicant: The Toronto-Dominion Bank, Toronto (CA)

(72) Inventors: Kyryll Odobetskiy, Waterloo (CA); Daniel Scott Brotherston, Kitchener (CA); Anil Stewart Bakhle, Guelph (CA); Amanda Hoi Man Cheung, Waterloo (CA)

(73) Assignee: The Toronto-Dominion Bank, Toronto (CA)

( * ) Notice: Subject to any disclaimer, the term of this patent is extended or adjusted under 35 U.S.C. 154(b) by 258 days.

(21) Appl. No.: 16/991,087

(22) Filed: Aug. 12, 2020

(65) Prior Publication Data

US 2022/0051190 A1    Feb. 17, 2022

(51) Int. Cl.
| | | |
|---|---|---|
| G06F 16/00 | (2019.01) | |
| G06Q 10/10 | (2012.01) | |
| G06F 9/54 | (2006.01) | |
| G06F 9/451 | (2018.01) | |
| G06F 16/58 | (2019.01) | |
| G06Q 40/00 | (2012.01) | |
| G06F 16/55 | (2019.01) | |
| G06F 16/23 | (2019.01) | |
| G06F 16/13 | (2019.01) | |

(52) U.S. Cl.
CPC ............ *G06Q 10/10* (2013.01); *G06F 9/451* (2018.02); *G06F 9/547* (2013.01); *G06F 16/13* (2019.01); *G06F 16/2379* (2019.01); *G06F 16/55* (2019.01); *G06F 16/5866* (2019.01); *G06Q 40/12* (2013.12)

(58) Field of Classification Search
CPC ...................................................... G06F 16/13
See application file for complete search history.

(56) References Cited

U.S. PATENT DOCUMENTS

| | | |
|---|---|---|
| 8,531,424 B1 | 9/2013 | Maloney et al. |
| 8,732,042 B2 | 5/2014 | Hammad et al. |
| 9,495,703 B1 | 11/2016 | Kaye, III |
| 2008/0245854 A1 | 10/2008 | Monden |

(Continued)

FOREIGN PATENT DOCUMENTS

EP    3614329 A1    2/2020

*Primary Examiner* — Ajith Jacob
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to obtain transfer records identifying value transfers associated with an account of a user, the transfer records including a transfer amount, a transfer date and a transfer descriptor; group the transfer records based on predefined criteria; within at least one group of the transfer records, identify one or more representative transfer records based at least on stored selection criteria; obtain an image associated with at least one of the representative transfer records; and send, via the communications module and to a computing device associated with the user, a transfer record summary interface, the transfer record summary interface including the image associated with the at least one representative transfer record.

20 Claims, 16 Drawing Sheets

(56) References Cited

U.S. PATENT DOCUMENTS

| | | |
|---|---|---|
| 2013/0268340 A1 | 10/2013 | Colon et al. |
| 2014/0012691 A1 | 1/2014 | Hanson et al. |
| 2018/0025396 A1 | 1/2018 | Roberts et al. |
| 2018/0137577 A1 | 5/2018 | Niderberg et al. |
| 2019/0213575 A1* | 7/2019 | Pujals ................ G06F 3/04847 |
| 2022/0138078 A1* | 5/2022 | Chen ................... G06F 11/3409 707/725 |

\* cited by examiner

SYSTEM AND METHOD FOR PROVIDING A GRAPHICAL USER INTERFACE

TECHNICAL FIELD

The present application relates to graphical user interfaces and, more particularly, to systems and methods for providing a graphical user interface.

BACKGROUND

Graphical user interfaces are often used to display information associated with transfer records associated with an account. For example, a graphical user interface may display information associated with transfer records in the form of a list or spreadsheet.

Graphical user interfaces and other such interfaces can result in an unnecessary waste in bandwidth and computer processing power as user interaction with the graphical user interface results in data exchanges between the computing device displaying the graphical user interface and the computer server providing the graphical user interface.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
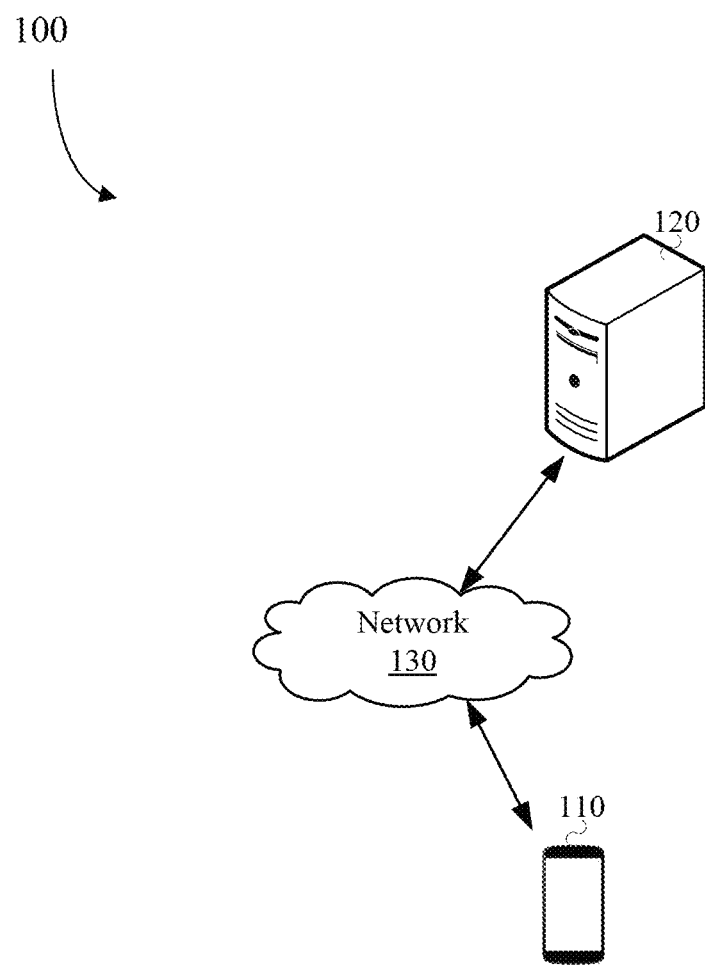
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to obtain transfer records identifying value transfers associated with an account of a user, the transfer records including a transfer amount, a transfer date and a transfer descriptor; group the transfer records based on predefined criteria; within at least one group of the transfer records, identify one or more representative transfer records based at least on stored selection criteria; obtain an image associated with at least one of the representative transfer records; and send, via the communications module and to a computing device associated with the user, a transfer record summary interface, the transfer record summary interface including the image associated with the at least one representative transfer record.

In one or more embodiments, the image is obtained from one of an application programming interface (API) and an image library stored on the computing device.

In one or more embodiments, the image is obtained from the image library stored on the computing device and the processor-executable instructions, when executed by the processor, further configure the processor to obtain permission to access the image library stored on the computing device; and associate one of the images within the image library to one of the representative transfer records based on a comparison of the representative transfer record and metadata of the associated image.

In one or more embodiments, the processor-executable instructions, when executed by the processor, further configure the processor to receive, via the communications module and from the computing device, a signal indicating a selection of one of the images; obtain all transfer records for the group represented by the selected image; and send, via the communications module and to the computing device, all transfer records for the group represented by the selected image.

In one or more embodiments, the processor-executable instructions, when executed by the processor, further configure the processor to tag at least one of the transfer records with a tag based on the transfer descriptor; and obtain the image based on the tag.

In one or more embodiments, the processor-executable instructions, when executed by the processor, further configure the processor to for at least one representative transfer record, identify a merchant based on the transfer descriptor; and obtain the image associated with the at least one representative transfer record based at least on the identified merchant, the image including at least one of an image of the merchant, an image of a logo associated with the merchant, an image of an item offered by the merchant, an image based on a type of the merchant or an image based on a location of the merchant.

In one or more embodiments, the processor-executable instructions, when executed by the processor, further configure the processor to determine that an image cannot be obtained for a particular representative transfer record; remove the particular representative transfer record as being the representative transfer record for a particular group of transfer records; and identify another transfer record as being representative for the particular group of transfer records based at least on the stored selection criteria.

In one or more embodiments, the transfer record summary interface includes an option to adjust the predefined criteria and the processor-executable instructions, when executed by the processor, further configure the processor to receive, via the communications module and from the computing device, a signal indicating that the user has adjusted the predefined criteria; group transfer records based on the updated predefined criteria; within at least one group of transfer records, identify one or more transfer records as being representative based at least on the stored selection criteria; for at least one representative transfer record that does not have an associated image, obtain an image; and send, via the communications module and to the computing device associated with the user, an updated transfer record summary interface, the updated transfer record summary interface including the image associated with the at least one representative transfer record.

In one or more embodiments, the predefined criteria includes a particular period of time.

In one or more embodiments, the stored selection criteria includes at least one of the transfer amount or the transfer descriptor.

According to another aspect there is provided a method comprising obtaining transfer records identifying value transfers associated with an account of a user, the transfer records including a transfer amount, a transfer date and a transfer descriptor; grouping the transfer records based on predefined criteria; within at least one group of the transfer records, identifying one or more representative transfer records based at least on stored selection criteria; obtaining an image associated with at least one of the representative transfer records; and sending, via a communications module and to a computing device associated with the user, a transfer record summary interface, the transfer record summary interface including the image associated with the at least one representative transfer record.

In one or more embodiments, the image is obtained from one of an application programming interface (API) and an image library stored on the computing device.

In one or more embodiments, the image is obtained from the image library stored on the computing device and the method further comprises obtaining permission to access the image library stored on the computing device; and associating one of the images within the image library to one of the representative transfer records based on a comparison of the representative transfer record and metadata of the associated image.

In one or more embodiments, the method further comprises receiving, via the communications module and from the computing device, a signal indicating a selection of one of the images; obtaining all transfer records for the group represented by the selected image; and sending, via the communications module and to the computing device, all transfer records for the group represented by the selected image.

In one or more embodiments, the method further comprises tagging at least one of the transfer records with a tag based on the transfer descriptor; and obtaining the image based on the tag.

In one or more embodiments, the method further comprises for at least one representative transfer record, identifying a merchant based on the transfer descriptor; and obtaining the image associated with the at least one representative transfer record based at least on the identified merchant, the image including at least one of an image of the merchant, an image of a logo associated with the merchant, an image of an item offered by the merchant, an image based on a type of the merchant or an image based on a location of the merchant.

In one or more embodiments, the method further comprises determining that an image cannot be obtained for a particular representative transfer record; removing the particular representative transfer record as being the representative transfer record for a particular group of transfer records; and identifying another transfer record as being representative for the particular group of transfer records based at least on the stored selection criteria.

In one or more embodiments, the transfer record summary interface includes an option to adjust the predefined criteria and the method further comprises receiving, via the communications module and from the computing device, a signal indicating that the user has adjusted the predefined criteria; grouping transfer records based on the updated predefined criteria; within at least one group of transfer records, identifying one or more transfer records as being representative based at least on the stored selection criteria; for at least one representative transfer record that does not have an associated image, obtaining an image; and sending, via the communications module and to the computing device, an updated transfer record summary interface, the updated transfer record summary interface including the image associated with the at least one representative transfer record.

In one or more embodiments, the stored selection criteria includes at least one of the transfer amount and the transfer descriptor.

According to another aspect there is provided a non-transitory computer readable storage medium comprising computer-executable instructions which, when executed, configure a processor to obtain transfer records identifying value transfers associated with an account of a user, the transfer records including a transfer amount, a transfer date and a transfer descriptor; group the transfer records based on predefined criteria; within at least one group of the transfer records, identify one or more representative transfer records based at least on stored selection criteria; obtain an image associated with at least one of the representative transfer records; and send, via the communications module and to a computing device associated with the user, a transfer record summary interface, the transfer record summary interface including the image associated with the at least one representative transfer record.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server 120 coupled to one another through a network 130, which may include a public network such as the Internet and/or a private network. The computing device 110 and the server 120 may be in geographically disparate locations. Put differently, the computing device 110 and the server 120 may be located remote from one another.

The server 120 is a computer system. The server 120 may be associated with an institution and may be a financial institution server. The server 120 may maintain a database that includes various transfer records associated with accounts of various customers or users. A transfer record may, for example, identify value transfers such as transactions made by the user. Each value transfer may be a value transfer made by the user using, for example, a credit card or a debit card linked to the account. The transfer records may include a transfer amount, a transfer date and a transfer descriptor. The transfer descriptor may include a name of a merchant and may include a location such as for example a city or country identifying where the transfer was initiated.

Although not shown, the server 120 may communicate with one or more application programming interfaces (APIs) which allows the server 120 to request and obtain data such as for example images via the network 130.

The computing device 110 may take a variety of forms such as a smartphone, a tablet computer, a wearable computer such as a head-mounted display or smartwatch, a laptop or desktop computer, or a computing device of another type.

The computing device 110 is adapted to present a graphical user interface that allows for communication with the server 120. For example, the computing device 110 may be adapted to receive, from the server 120, a transfer record summary interface that includes one or more images.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
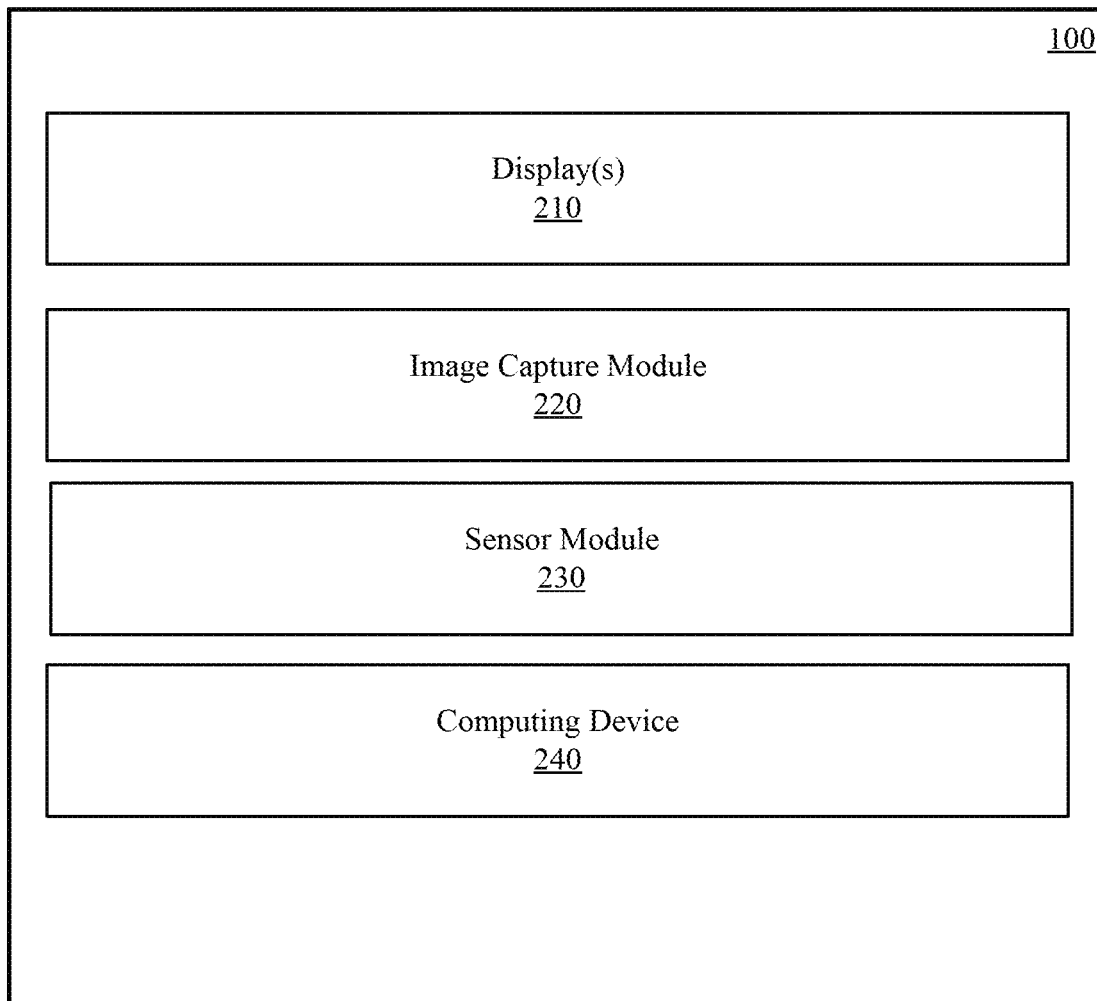
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
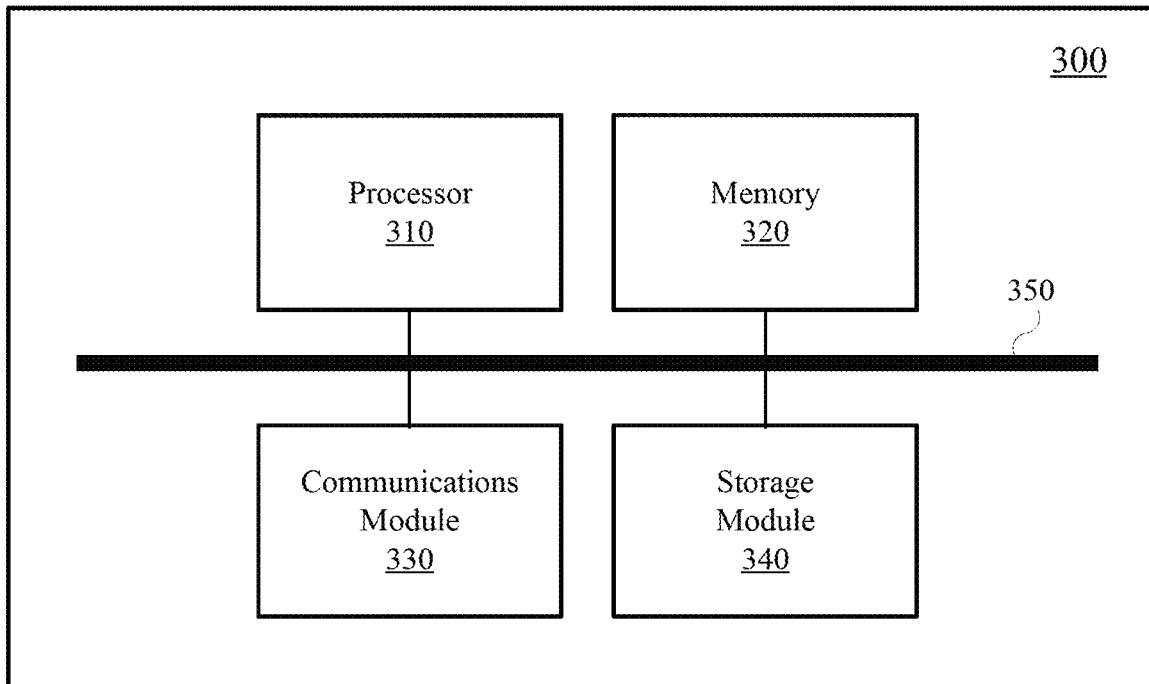
FIG. 3 is a high-level schematic diagram of an example computing device.

Referring now to FIG. 3, a high-level operation diagram of an example computer device 300 is shown. In some embodiments, the computer device 300 may be exemplary of the computer device 240 (FIG. 2) and the server 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
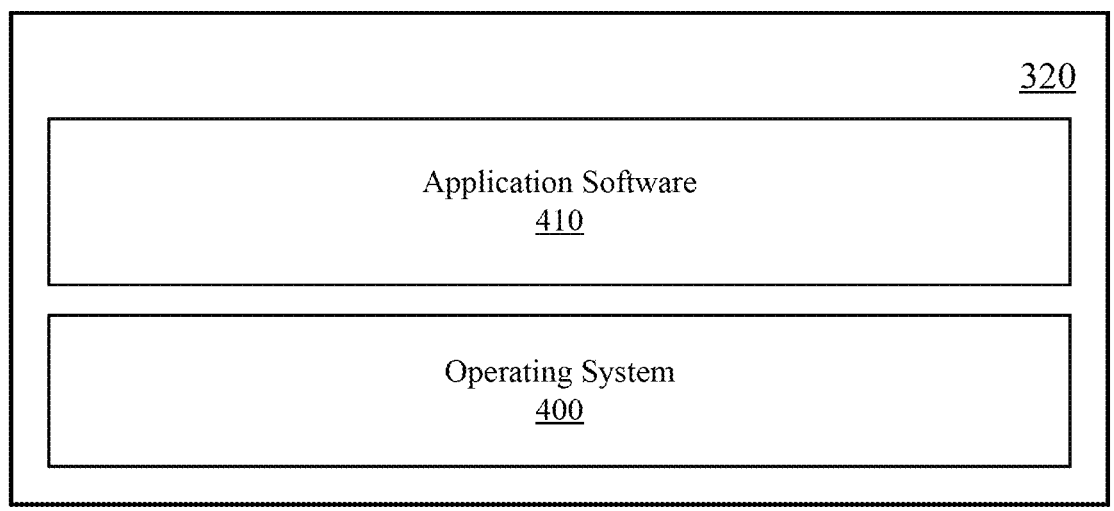
FIG. 4 shows a simplified organization of software components stored in a memory of the example computing device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server 120 and may provide various banking functions such as, for example, the ability to display a quantum of value in one or more transfer records (e.g. display balances), configure transfers of data (e.g. bill payments and other transfers), configure budgeting tools, display a graphical user interface such as for example a transfer record summary interface, and account management functions.

By way of further example, in at least some embodiments in which the computer device 300 functions as the computing device 110, the applications 410 may include a web browser, which may also be referred to as an Internet browser. In at least some such embodiments, the server 120 may be a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more transfer records (e.g. display balances), configure transfers of data (e.g. bill payments and other transfers), configure budgeting tools, display a graphical user interface such as for example a transfer record summary interface, and account management functions.

By way of further example, in at least some embodiments in which the computer device 300 functions as the computing device 110, the applications 410 may include a spending summary application. The spending summary application may be configured for secure communications with the server 120 and may display a graphical user interface such as for example a transfer record summary interface provided by the server 120.

By way of further example, in at least some embodiments in which the computer device 300 functions as the server 120, the applications 410 may include an application configured for secure communications with an application programming interface (API). For example, the server 120 may be configured to send, via the communications module and to the API, a request for an image and may receive, via the communications module and from the API, the requested image.

When a user wishes to view past or previously-stored transfer records within their account, the user may utilize an input interface (such as a keyboard and/or touchscreen) associated with the computing device 110 to cause the computing device 110 to open an application such as a mobile banking application, a spending summary application or may cause the computing device 110 to open a webpage via a web browser. Touch gestures, for example, may be used. Once the application or webpage has been opened on the computing device 110, the user may be required to enter authentication information such as for example a username and password. When the user has been authenticated, the computing device 110 may display a graphical user interface (GUI) that includes at least one selectable option which may be used to view past or previously-stored transfer records. When the user selects the at least one selectable option, a signal is sent to the server 120. The server 120 receives the signal, via the communications module and from the computing device 110, and in response the server 120 performs a method.

Figure 5:
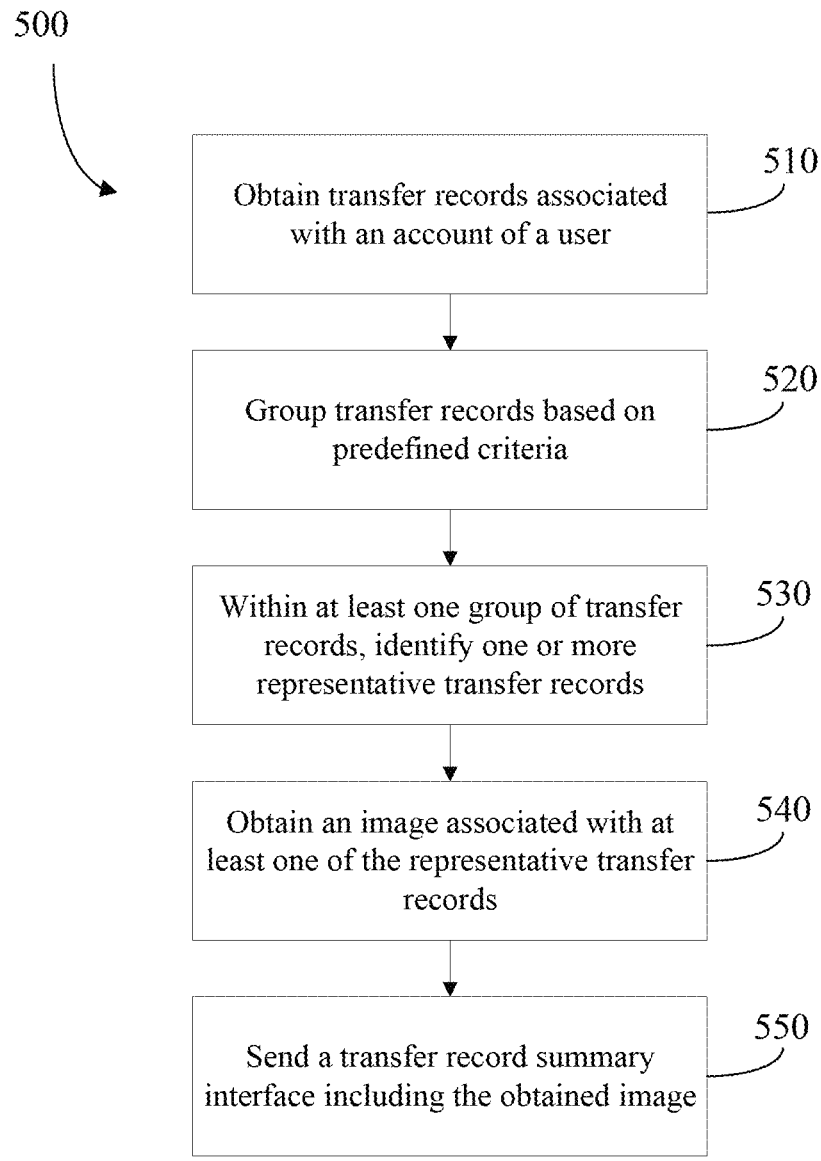
FIG. 5 is a flowchart showing operations performed by a server in providing a transfer record summary interface according to an embodiment.

FIG. 5 is a flowchart showing operations performed by the server 120 according to an embodiment. The operations may be included in a method 500 which may be performed by the server 120. For example, computer-executable instructions stored in memory of the server 120 may, when executed by one or more processors, configure the server 120 to perform the method 500 or a portion thereof.

The server 120 obtains transfer records associated with an account of the user (step 510). As mentioned, in this embodiment the user may authenticate using a username and a password. Once the user has been authenticated, the server 120 may obtain transfer records associated with the account of the user from the database. The transfer records identify value transfers such as transactions made by the user. Each transfer record includes a transfer amount, a transfer date and a transfer descriptor. The transfer descriptor may include a name of a merchant and may include a location such as for example a city or country identifying where the transaction was initiated.

The server 120 may obtain all available transfer records associated with the account of the user or may only obtain transfer records for transactions made within the past six (6) months, one (1) year, two (2) years, five (5) years, etc.

The transfer records are grouped based on predefined criteria (step 520). In this embodiment, the predefined criteria may include a default setting. The default setting may be adjusted by the user.

In this embodiment, the transfer records are grouped based on the date of the transaction. For example, transfer records may be grouped by day, week, month or year. In this embodiment, the predefined criteria groups the transfer records based on month. Put another way, transfer records reflecting value transfers made within the same month are grouped together. Other examples of predefined criteria may be based on a location identified by the transfer descriptor.

Within at least one group of transfer records, one or more representative transfer records are identified based at least on stored selection criteria (step 530).

In this embodiment, the stored selection criteria may be based on the transfer amount, the transfer descriptor, and/or the date of the transaction. For example, all transfer records within a group may be compared to one another, and the transfer record having the highest transfer amount may be selected as a representative transfer record for that group.

The stored selection criteria may identify one or more representative transfer records as being interesting and may identify the interesting transfer record as being the representative transfer record. An interesting transfer record may be a transfer record that the user is likely to find interesting. An interesting transfer record may be identified based on one or more of the transfer amount, the transfer descriptor and the date of the transaction.

For example, all transfer records within a group may be compared to one another, and the transfer record that includes a transfer descriptor identifying an interesting merchant or location may be selected as a representative transfer record for that group. The interesting location or merchant may be a popular restaurant. To identify the interesting location or merchant, the server 120 may determine that transfer descriptor identifies a restaurant. To determine if the restaurant is a popular restaurant, the server 120 may send a request to the API requesting, for example, a number of images available for that restaurant. When the API responds with the number of images, the server 120 may determine that the restaurant is a popular restaurant when the number of images exceeds a threshold. When more than one transfer record within the group includes a transfer descriptor that identifies a restaurant, the server 120 may send a request to the API for each transfer record that includes a transfer descriptor that identifies a restaurant and may select the transfer record corresponding to the restaurant with the greatest number of images as being the representative transfer record for the group. Other examples of interesting locations or merchants include sporting venues, luxury shops, bars, nightclubs, tourist attractions, theme parks, etc.

The API may additionally or alternatively determine that a particular location or merchant is popular or interesting based on a number of social media interactions for an account of the particular location or merchant. For example, the API may view a social media account of the particular location or merchant and may obtain information indicating a number of followers or interactions made within the social media network for that particular location or merchant.

The server 120 may tag at least one of the transfer records with a tag based on a location or merchant identified by the transfer descriptor included in the at least one transfer record. For example, the server 120 may tag transfer records that include transfer descriptors identifying locations or merchants located outside of a home city, province, state or country of the user. In this example, the server 120 may determine the location of the user's home based on stored identity data associated with the account of the user. When one or more transfer records indicate locations or merchants located outside of, for example, the home country of the user, these transfer records may be tagged based on the location. For example, when a user is travelling abroad and one or more transfer records include transfer descriptions identifying transfers initiated at locations or merchants located in Paris, France, these transfer records may be tagged with "Paris" or "Paris, France." The one or more transfer records tagged with "Paris" or "Paris, France" may be identified as the one or more representative transfer records for the group.

The server 120 may tag at least one of the transfer records with a tag based on a category of the merchant or location identified by the transfer descriptor. For example, where a transfer record identifies a merchant that is a grocery store, a tag such as "Groceries" or "Grocery Store" may be assigned to the transfer record. Other examples of tags include "Coffee Shop", "Restaurant", etc.

The server 120 may ignore some transfer records when identifying one or more representative transfer records for the group. For example, transfer records that include transfer descriptors identifying locations or merchants that may be associated with negative events may be ignored. Examples of locations or merchants that may be associated with negative events include health care centers (hospitals, clinics, etc.), pharmacies, veterinarian clinics, car repair centers, etc. Other examples of locations or merchants records that may be ignored include membership fees, gas stations, etc. As mentioned, transfer records may be assigned a tag by the server 120 and as such transfer records tagged with particular tags may be ignored by the server 120.

The server 120 may identify one or more transfer records as being the one or more representative transfer records based on the date. For example, transfer records indicating a transaction made on a particular day such as on a weekend may be identified as the one or more representative transfer records. As another example, transfer records indicating transactions made on the user's birthday or on a national holiday may be identified as the one or more representative transfer records.

The server 120 obtains an image associated with at least one of the representative transfer records (step 540).

In this embodiment, the server 120 may obtain the image an image library stored on the computing device 110, may obtain the image from the API, or may obtain the image from memory.

Figure 6:
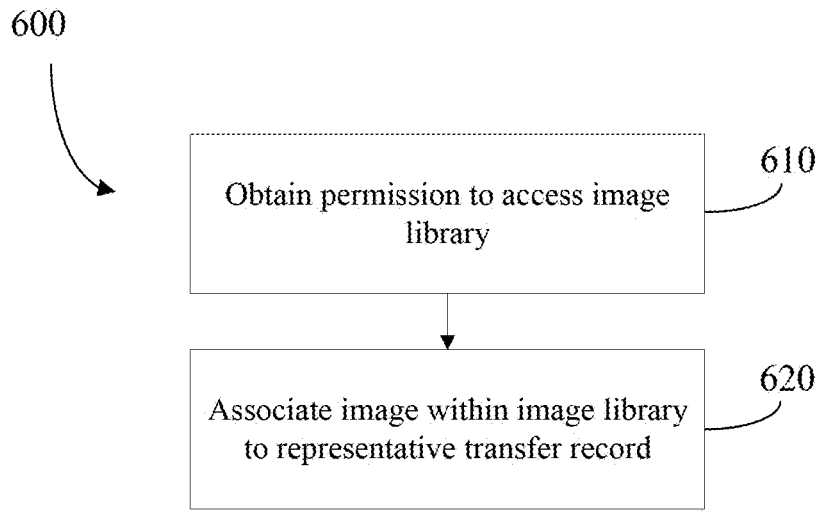
FIG. 6 is a flowchart showing operations performed by a server in obtaining an image from an image library according to an embodiment.

FIG. 6 is a flowchart showing operations performed by the server 120 in obtaining the image from an image library stored on the computing device 110. The operations may be included in a method 600 which may be performed by the server 120. For example, computer-executable instructions stored in memory of the server 120 may, when executed by one or more processors, configure the server 120 to perform the method 600 or a portion thereof.

The server 120 obtains permission to access the image library (step 610).

In this embodiment, the server 120 sends, via the communications module and to the computing device 110, a signal requesting permission to access the image library associated with the computing device 110. The signal may cause the computing device 110 to display a message requesting access to the image library. The message may include one or more selectable options to accept or deny the request. The server 120 receives permission when a signal is received, via the communication module, indicating that the user has accepted the request.

It will be appreciated that the server 120 may have previously obtained permission to access the image library. As such, in response to the computing device 110 receiving the signal requesting access to the image library, the server 120 may receive a signal, via the communications module and from the computing device 110, indicating that the server 120 has permission to access the image library.

It will be appreciated that the image library may be stored in memory of the computing device 110 or may be stored in cloud storage and accessed through a network.

The server 120 selects an image from the image library and associates the image with the one or more representative data records (step 620). The server 120 stores the selected image in memory.

The metadata of the images in the image library may indicate a location or merchant and/or a date of when the image was taken. As such, in this embodiment, the server 120 compares the one or more representative transfer records to metadata associated with images in the image library. For example, the metadata of one or more of the images in the image library may identify a location that corresponds to a location identified by the transfer descriptor of the one or more representative transfer records and one of these images is obtained by the server 120. When the merchant is a restaurant, the obtained image may be an image taken when the user was at the restaurant. The image may be a picture of food ordered at the restaurant, a picture of the user at the restaurant, etc.

As another example, the metadata of one or more of the images in the image library may identify a location that corresponds to a tag of one or more of the transfer records and one of these images is obtained by the server 120. As mentioned above, the tag for the one or more transfer records may be "Paris" or "Paris, France" and as such the server 120 may obtain an image from the image library that has metadata indicating that the image was taken in "Paris" or "Paris, France".

Figure 7:
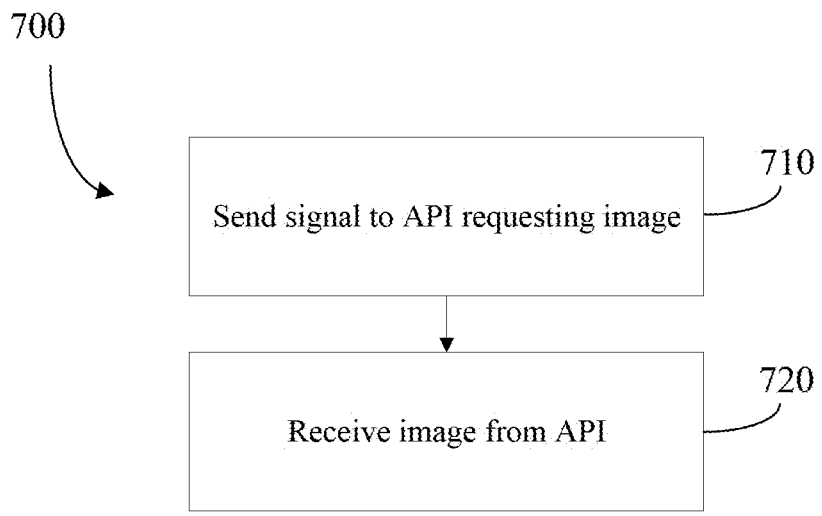
FIG. 7 is a flowchart showing operations performed by a server in obtaining an image from an application programming interface according to an embodiment.

FIG. 7 is a flowchart showing operations performed by the server 120 in obtaining the image from the API. The operations may be included in a method 700 which may be performed by the server 120. For example, computer-executable instructions stored in memory of the server 120 may, when executed by one or more processors, configure the server 120 to perform the method 700 or a portion thereof.

The server 120 sends, via the communications module and to the API, a signal requesting an image (step 710). The signal includes information such as the tag, location or merchant of which the image is to be obtained.

For example, the server 120 may identify a location or merchant based on the transfer descriptor of the one or more representative transfer records. The signal sent to the API may include information regarding the identified location or merchant, such as the name of a restaurant, etc.

In response to receiving the signal, the API obtains the requested image. For example, where the signal includes information regarding the identified merchant, the API may obtain an image of the merchant, an image of a logo associated with the merchant, an image of an item offered by the merchant, an image based on a type of the merchant or an image based on a location of the merchant.

As mentioned, the signal may include information such as the tag. For example, the tag may be "Paris" or "Paris, France". As such, the API may obtain an image associated with "Paris" or "Paris, France."

The server 120 receives, via the communications module and from the API, the image (step 720). The server 120 associates the received image with the one or more representative transfer records and stores the received image in memory.

Figure 8:
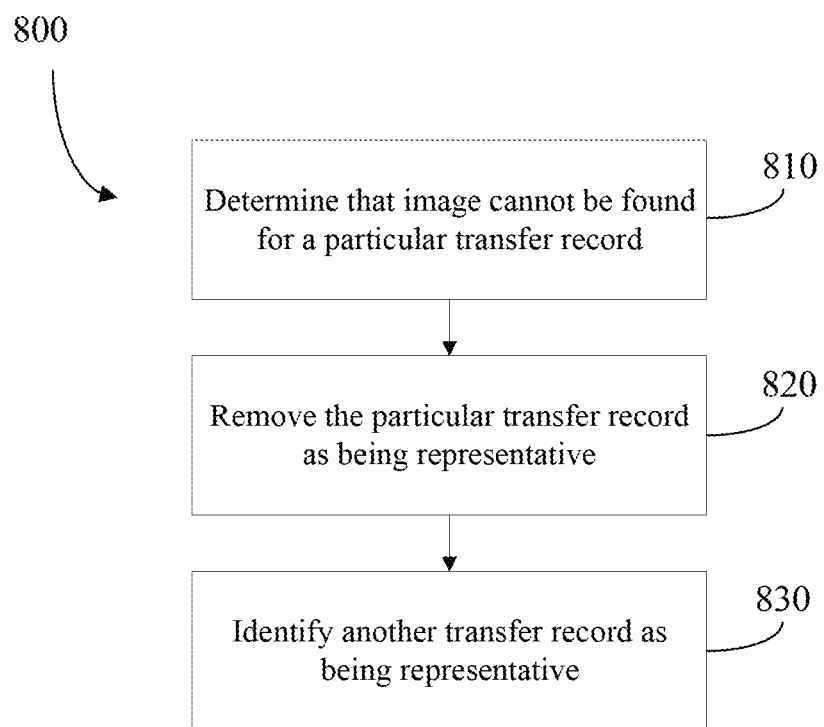
FIG. 8 is a flowchart showing operations performed by a server in determining that an image cannot be found for a particular transfer record according to an embodiment.

It will be appreciated that in some embodiments, an image cannot be found for a particular representative transfer record. FIG. 8 is a flowchart showing operations performed by the server 120 in determining that an image cannot be found for a particular representative transfer record. The operations may be included in a method 800 which may be performed by the server 120. For example, computer-executable instructions stored in memory of the server 120 may, when executed by one or more processors, configure the server 120 to perform the method 800 or a portion thereof.

The server 120 determines that an image cannot be found for a particular one or more representative transfer records (step 810). For example, the image library may not have an image that has metadata that corresponds to the one or more particular transfer records. As another example, the API may send a signal indicating that the requested image cannot be found.

In response to determining that an image cannot be found, the server 120 removes the particular transfer record as being representative for the group (step 820).

The server then identifies another one or more data representative transfer records with the group of transfer records (step 830). It will be appreciated that the one or more representative transfer records is identified in a manner similar to that described above with reference to step 530. Of course, the particular one or more transfer records that the server 120 was not able to obtain an image for are no longer eligible to be selected as the one or more representative transfer records.

The server 120 may retrieve the image from memory. For example, the server 120 may have previously obtained an image for a particular representative transfer record and stored the image in memory. This may reduce the computer processing power and bandwidth required to generate the transfer record summary interface as previously obtained images may be easily retrieved by the server 120.

As mentioned, the server 120 may obtain the image from memory, from the image library stored on the computing device 110 or may obtain the image from the API. The server 120 may attempt to (first) obtain the image from memory. When no image is available from memory, the server 120 may attempt to obtain the image from the image library stored on the computing device 110. When no image is available within the image library stored on the computing device 110, the server 120 may obtain the image from the API. Alternatively, when no image is available in memory, the server 120 may attempt to obtain the image from the API.

When no image is available from the API, the server 120 may obtain the image from the image library stored on the computing device 110. As another example, the server 120 may not have permission to access the image library stored on the computing device 110 and as such must obtain the image from the API. In some embodiments, when the server 120 cannot obtain an image from memory, cannot obtain an image from the image library stored on the computing device 110 and cannot obtain an image from the API, a default image may be used. Alternatively, when the server 120 cannot obtain an image from memory, cannot obtain an image from the image library stored on the computing device 110 and cannot obtain an image from the API, a different representative data record may be selected as described with reference to method 800.

As mentioned, when the image is obtained by the server 120, either from the image library stored on the computing device 110 or the API, the server 120 associates the image with the one or more representative transfer records and stores the obtained image in memory.

The server 120 sends, via the communications module and to the computing device 110, a transfer record summary interface (step 550). The transfer record summary interface is a GUI and includes the image associated with the at least one representative transfer record. The transfer record summary interface allows for communication with the server 120. The transfer record summary interface, when received by the computing device 110, is displayed on the computing device 110. The transfer record summary interface may be displayed within the mobile application or webpage described above.

The server 120 generates a graphical user interface (referred to as a transfer record summary interface) that provides a simple visual representation of transfer records identifying value transfers associated with an account of the user. The graphical user interface includes an accurate visual representation of each group of transfer records. The graphical user interface reduces the computer processing power and bandwidth required to review or access transfer records as the user is able to easily select a group of transfer records based on a single representative image of the group. The graphical user interface is generated by the system in real time and as such the most recent transfer records are included when generating the transfer record summary interface. Since images are obtained only for representative transfer records, the processing power and bandwidth required to generate the graphical user interface is reduced.

Figure 9:
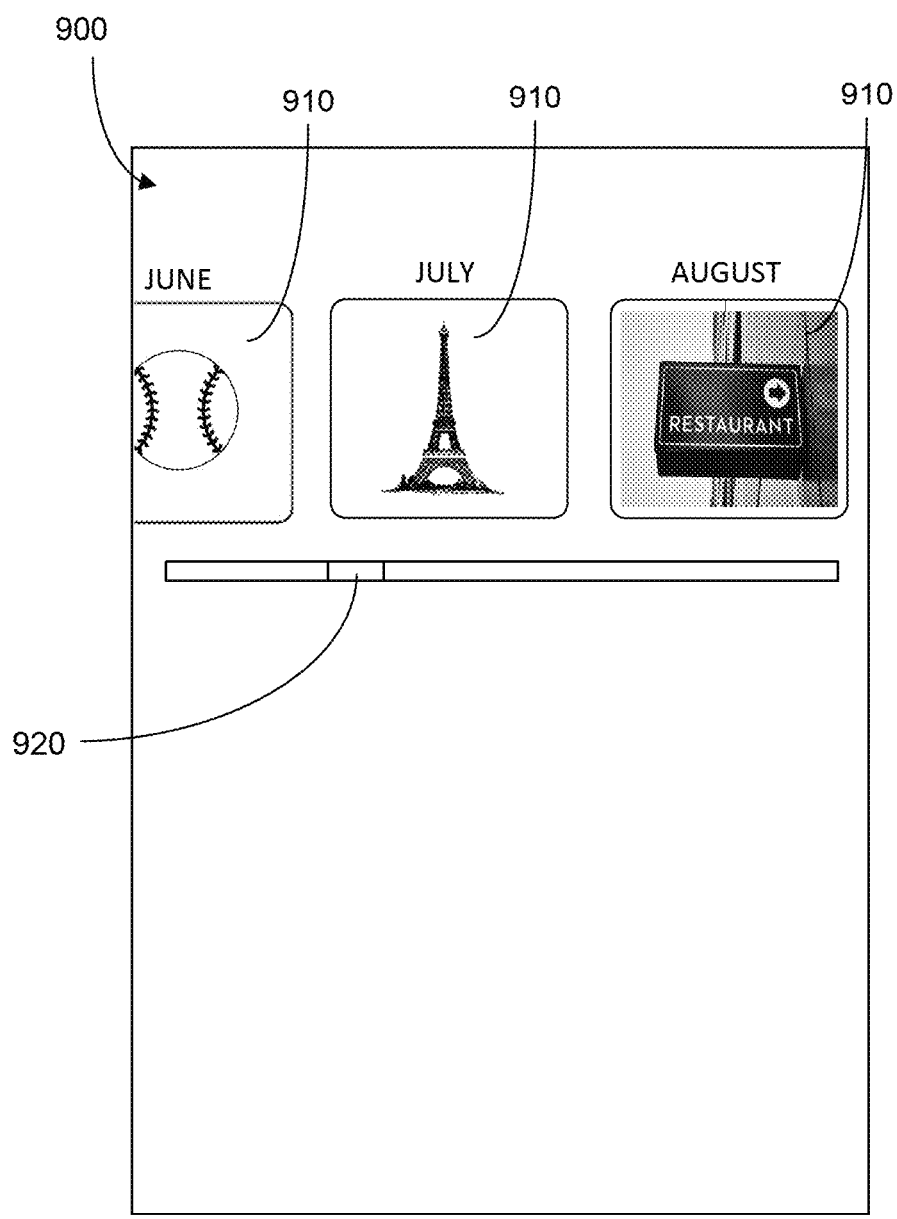
FIG. 9 is an example screen of a transfer record summary interface according to an embodiment.

An example transfer record summary interface 900 is shown in FIG. 9. The transfer record summary interface 900 includes images 910 associated with at least one representative transfer record for transfer records grouped based on the date of the transaction, specifically, transfer records grouped by month. Although only the months of June, July and August are shown in FIG. 9, it will be appreciated that additional months are included with the transfer record summary interface 900 and may be viewed by the user by manipulating a slider 920. The user may manipulate the slider using, for example, gestures such as touch input on a display screen of the computing device 110.

In the example transfer record summary interface 900, the one or more representative transfer records for the month of June may have been identified based on the transfer descriptor of the one or more transfer records identifying a location or merchant associated with purchasing baseball tickets or attending a baseball game. As such, the image associated with the at least one representative transfer record is an image based on baseball. For the month of July, the one or more representative transfer records may have been identified based on transfer records tagged "Paris" or "Paris, France" and as such the image associated with the at least one representative transfer record is an image of the Eiffel Tower. For the month of August, the one or more representative transfer records may have been identified based on a transfer record having a transfer descriptor identifying a popular restaurant and as such the image associated with the at least one representative transfer record is an image of the restaurant.

Each image 910 may be selected by the user to obtain additional information regarding the group of which the image is associated. For example, the user may select one of the images 910 via touch input on the display screen of the computing device 110 to obtain additional information regarding the group of which the image is associated.

Figure 10:
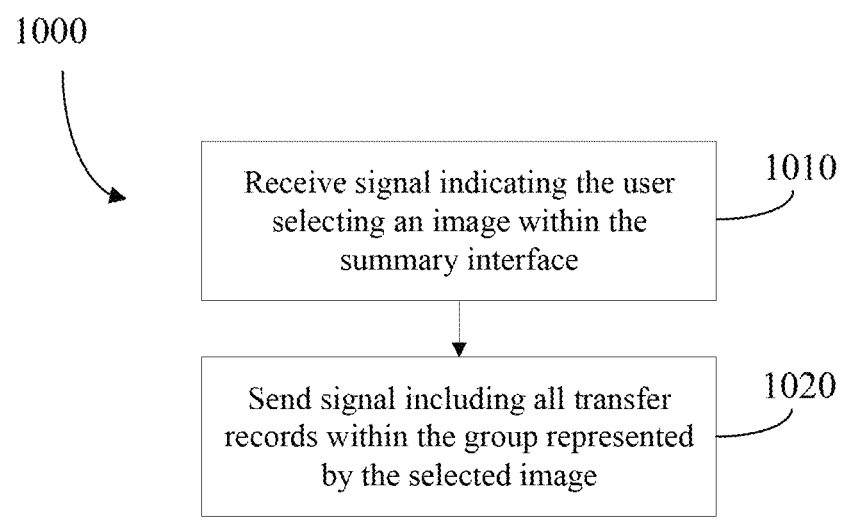
FIG. 10 is a flowchart showing operations performed by a server in sending data for all transfer records within a group represented by a selected image according to an embodiment.

FIG. 10 is a flowchart showing operations performed by the server 120 in providing additional information regarding the group of which the selected image is associated. The operations may be included in a method 1000 which may be performed by the server 120. For example, computer-executable instructions stored in memory of the server 120 may, when executed by one or more processors, configure the server 120 to perform the method 1000 or a portion thereof.

In response to the user selecting one of the images 910, the server 120 receives, via the communications module and from the computing device 110, a signal indicating that that the user has selected the image 910 within the transfer record summary interface 900 (step 1010). The signal identifies which image 910 is selected. Put another way, the signal identifies which group of transfer records the selected image represents.

The server 120 obtains all transfer records for the group represented by the selected image 910, and sends, via the communications module and to the computing device 110, a signal including all transfer records for the group represented by the selected image (step 1020).

The computer processing power and bandwidth required by the server 120 is reduced since all transfer records for a group are only obtained and provided to the user when the user selects the image representing the group. Put another way, the server 120 is only required to provide all transfer records for a group when requested by the user.

Figure 11:
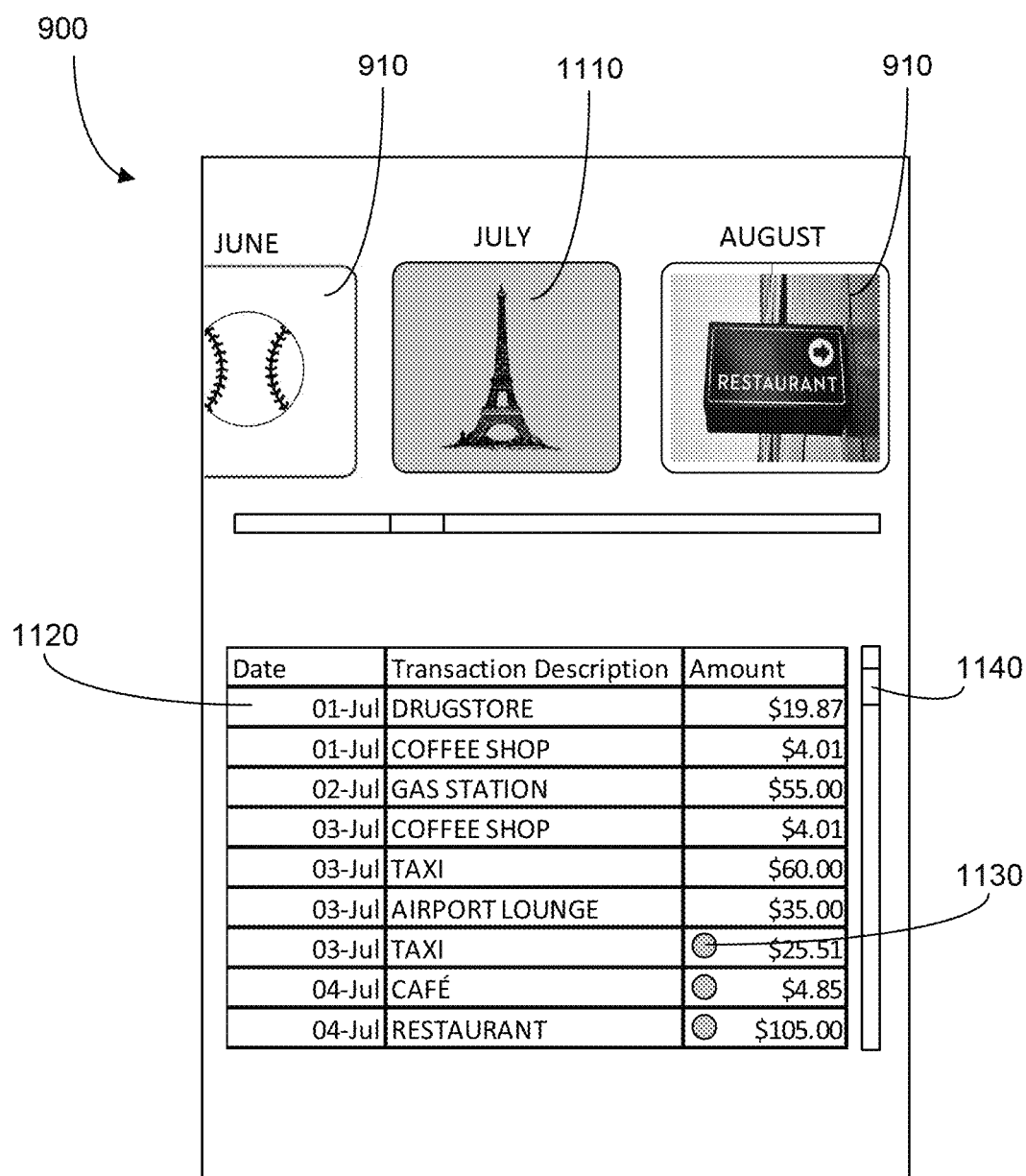
FIG. 11 is an example screen of a transfer record summary interface according to an embodiment.

The transfer record summary interface displays, on the display screen of the computing device 110, all transfer records for the group represented by the selected image 910. An example is shown in FIG. 11 where a selected image 1110 is highlighted within the transfer record summary interface 900. All transfer records for the group represented by the selected image 1110, specifically the month of July, are displayed below the images 910. In this embodiment, the transfer records are displayed as a list of transfer records 1120. The list of transfer records 1120 is sorted by date. Transfer records that correspond to foreign transactions, that is, transfer records that required a foreign currency exchange, are marked with an indicia 1130. It will be appreciated that while all transfer records are available to be viewed by the user, only a number of transfer records may be viewed at a given time due to the size of the display screen of the computing device 110. Additional transfer records may be viewed by the user by manipulating a slider 1140. The user may manipulate the slider using, for example, gestures such as touch input on the display screen of the computing device 110.

Figure 12:
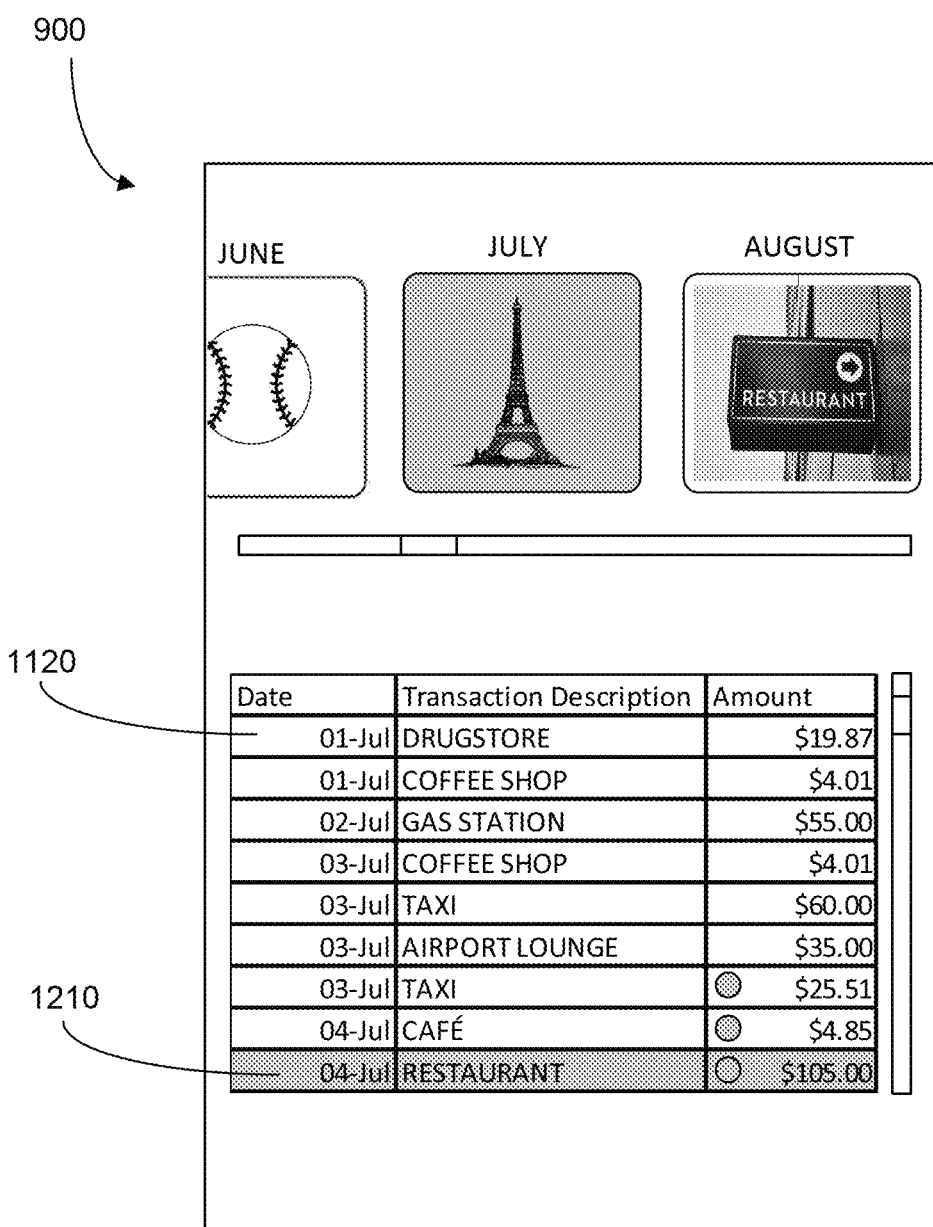
FIG. 12 is an example screen of a transfer record summary interface according to an embodiment.

Each transfer record in the list of transfer records 1120 may be selected by the user to obtain additional information regarding that particular transfer record. As shown in FIG. 12, the user may select one of the transfer records 1210 via touch input on the display screen of the computing device 110 to obtain additional information regarding the selected transfer record 1210. The selected transfer record 1210 may be highlighted.

Figure 13:
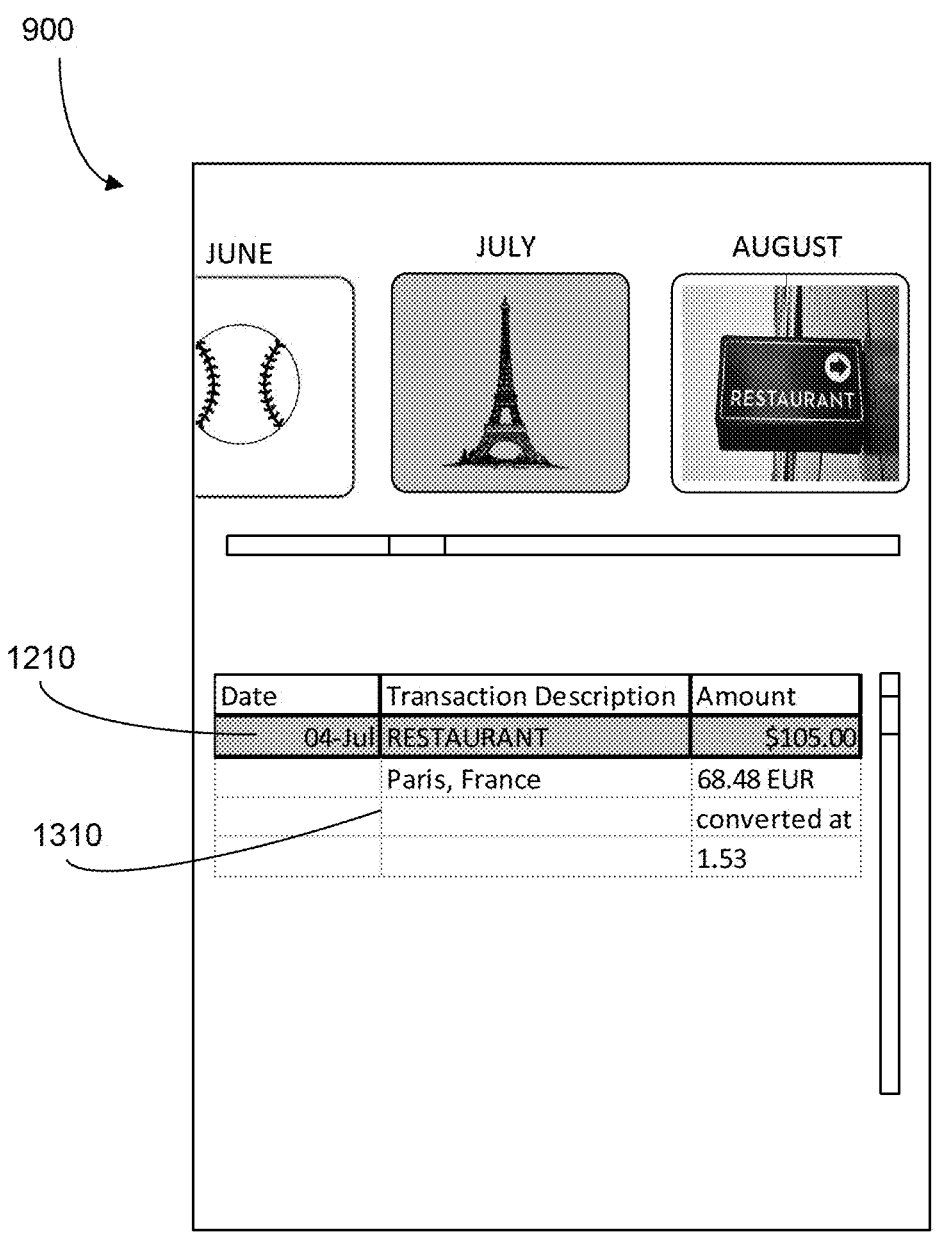
FIG. 13 is an example screen of a transfer record summary interface according to an embodiment.

In response to one of the transfer records 1210 being selected, the transfer record summary interface 900 displays the additional information regarding the selected transfer record 1120. An example is shown in FIG. 13. As can be seen, additional information 1310 is displayed below the selected transfer record 1210. The additional information 1310 includes the location of the transaction and foreign currency exchange information (if required). The transfer descriptor identifying the location or merchant associated with the transaction continues to be displayed.

Figure 14:
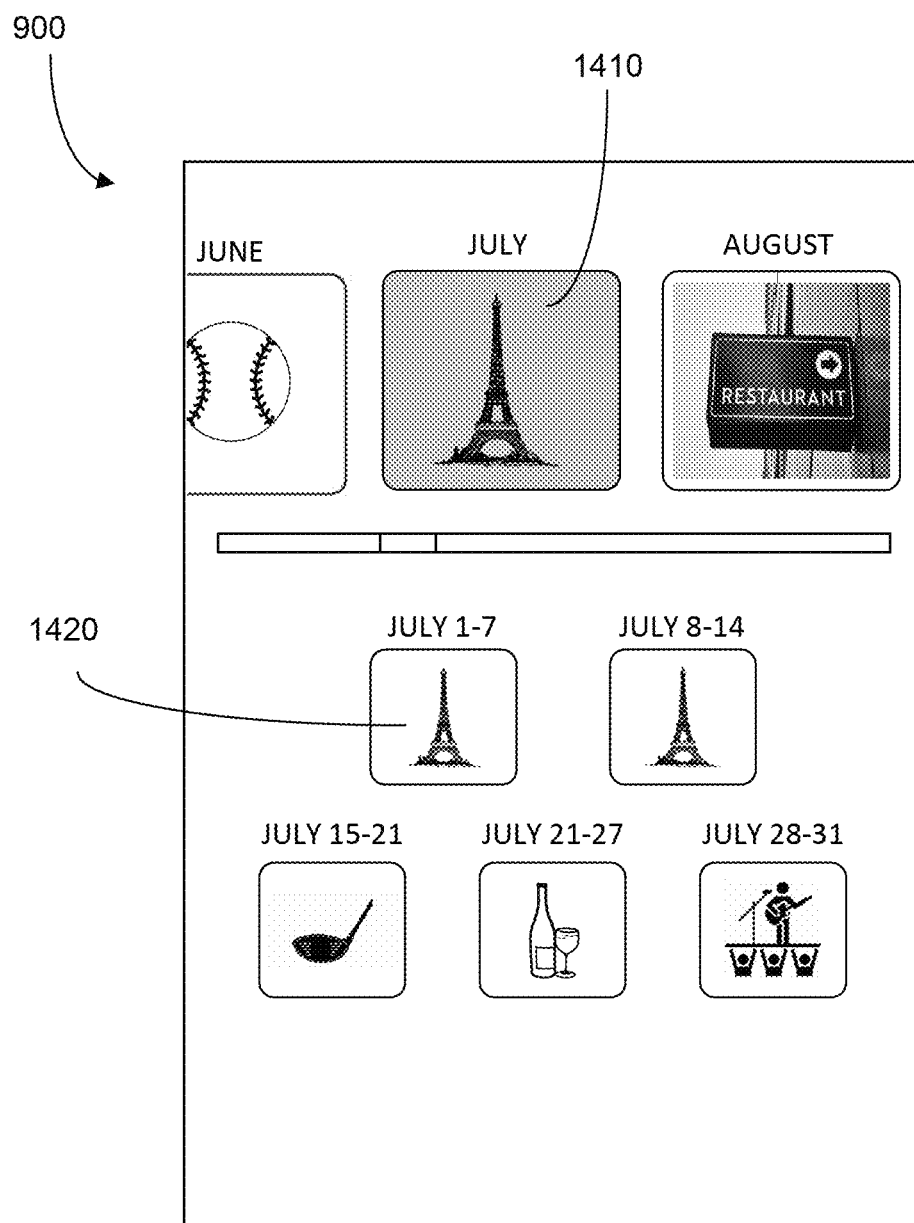
FIG. 14 is an example screen of a transfer record summary interface according to an embodiment.

In another embodiment, rather than displaying the additional information for all transfer records within a group as a list of transfer records, images associated with one or more representative transfer records for sub-groups within the group may be displayed. An example is shown in FIG. 14. As can be seen, a selected image 1410 is highlighted within the transfer record summary interface 900. Data for all transfer records of the group represented by the selected image 1410, specifically the month of July, are displayed below the images. In this embodiment, the data is displayed such that images associated with one or more representative transfer records within sub-groups (of the group of which image 1410 is associated) are shown. In this example, selected image 1410 represents a group of transfer records for a particular month, July. As such, images 1420 are shown which represent groups of transfer records for particular weeks (or sub-groups) within the month of July. It will be appreciated that when one of the images 1420 is selected, additional information for transfer records within that week may be displayed. The additional information may be in the form of a list of transfer records (similar to FIG. 11) or may be images associated with one or more representative transfer records for sub-groups (in this case, days) within the group (week). The server 120 may obtain images for each sub-group in a manner similar to that described above and this may be done when a particular image (such as image 1410) is selected or may be done prior to the server 120 sending the transfer record summary interface to the computing device 110.

By providing images for each sub-group, the computer processing power required by the server 120 is reduced as the server 120 is not required to obtain all transfer records for the group. Rather, the server 120 is only required to provide an image for representative transfer records of each sub-group. The server 120 is only required to provide all transfer records for the sub-group when requested by the user, for example, when the user selects the image representing the sub-group.

Figure 15:
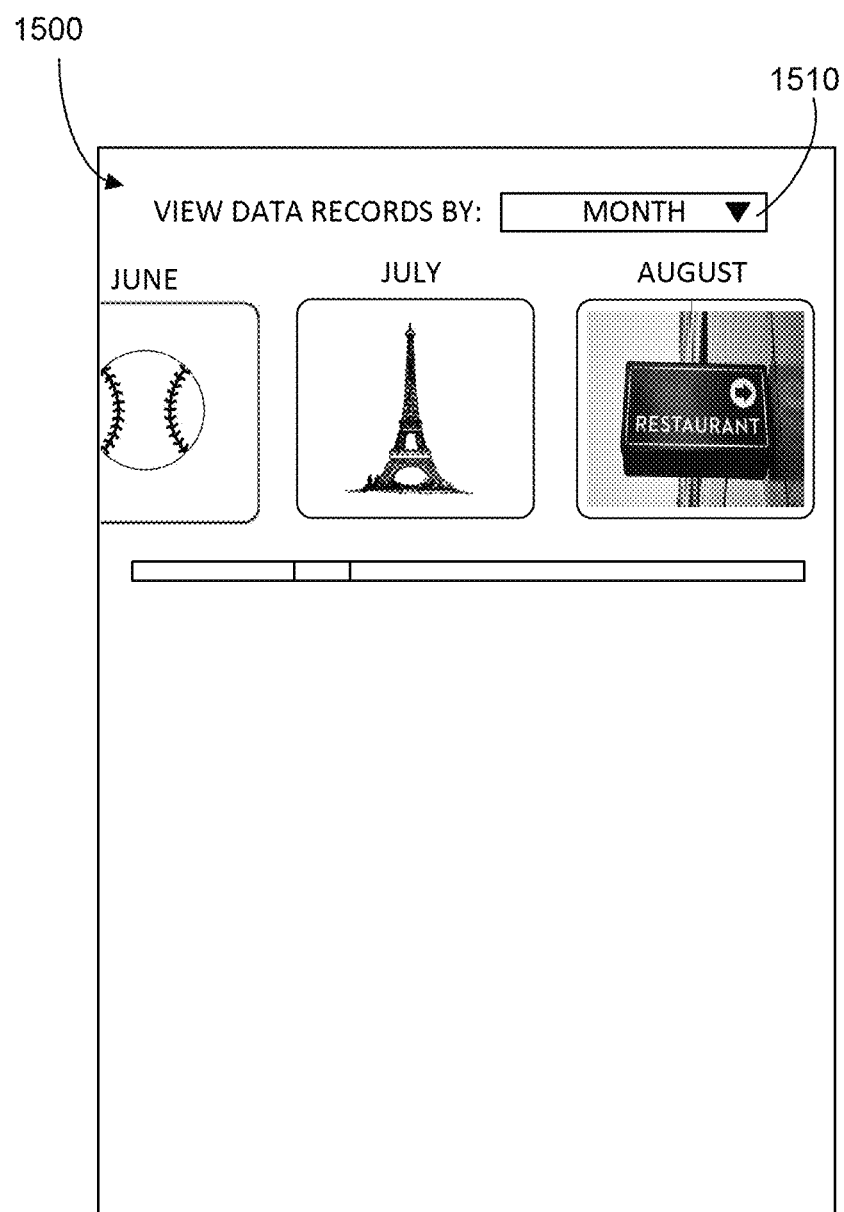
FIG. 15 is an example screen of a transfer record summary interface according to an embodiment.

As mentioned, the predefined criteria used to group the transfer records may be a default setting. The default setting or criteria may be adjusted by the user. An example transfer record summary interface 1500 is shown in FIG. 15. Transfer record summary interface 1500 is similar to transfer record summary interface 900 with the following exception. In this embodiment, the transfer record summary interface 1500 includes a selectable option 1510 to update the criteria defining how the transfer records are grouped.

In this embodiment, the selectable option 1510 is in the form of a drop down menu. When selected via touch input on the display screen of the computing device 110, the selectable option 1510 displays a number of options defining how the transfer records are to be grouped. The options may include by day, week, month or year. In response to the user adjusting or selecting a different criteria, the server 120 may perform a method to generate an updated transfer record summary interface.

Figure 16:
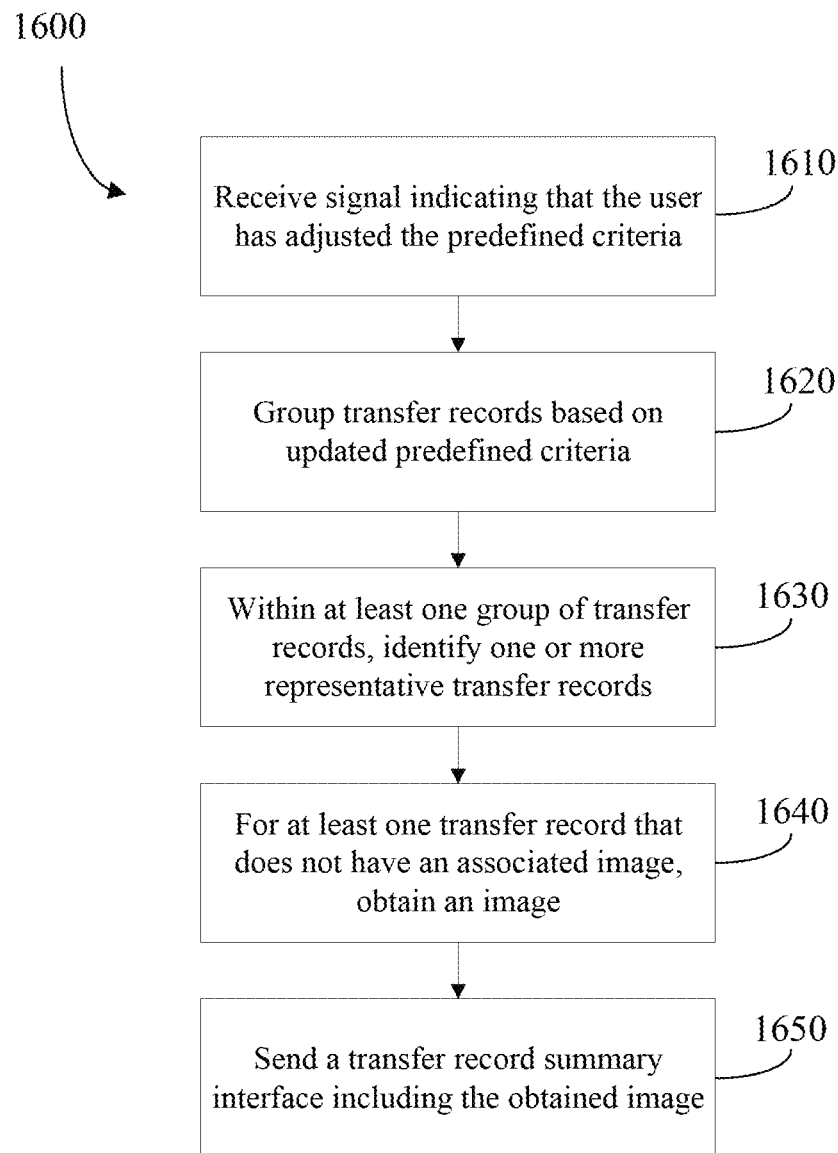
FIG. 16 is a flowchart showing operations performed by a server in providing an updated transfer record summary interface according to an embodiment.

FIG. 16 is a flowchart showing operations performed by the server 120 in generating an updated transfer record summary interface. The operations may be included in a method 1600 which may be performed by the server 120. For example, computer-executable instructions stored in memory of the server 120 may, when executed by one or more processors, configure the server 120 to perform the method 1600 or a portion thereof.

The server 120 receives, via the communication module and from the computing device 110, a signal indicating that the user has adjusted the criteria (step 1610). As mentioned, in this embodiment the signal is received in response to the user selecting a different criteria using selectable option 1510.

The server 120 groups the transfer records based on the updated predefined criteria (step 1620). As an example, the transfer records may be currently grouped by month and the updated criteria may request that the transfer records be grouped by week. As such, the server 120 groups the transfer records by week. Put another way, transfer records reflecting transactions made within the same week are grouped together.

Within at least one group of transfer records, the server 120 identifies one or more representative transfer records (step 1630). The server 120 identifies one or more representative transfer records in a manner similar to step 530 described above.

For at least one representative transfer record that does not have an associated image, obtain an image (step 1640). The server 120 identifies representative transfer records that do not already have an associated image. For example, the server 120 may determine that a particular representative transfer record does not have an associated image stored in memory. As such, an image associated with each representative transfer record that does not have already have an associated image is obtained in a manner similar to step 1640 described above.

The server 120 sends an updated transfer record summary interface that includes the obtained image (step 1650).

Figure 17:
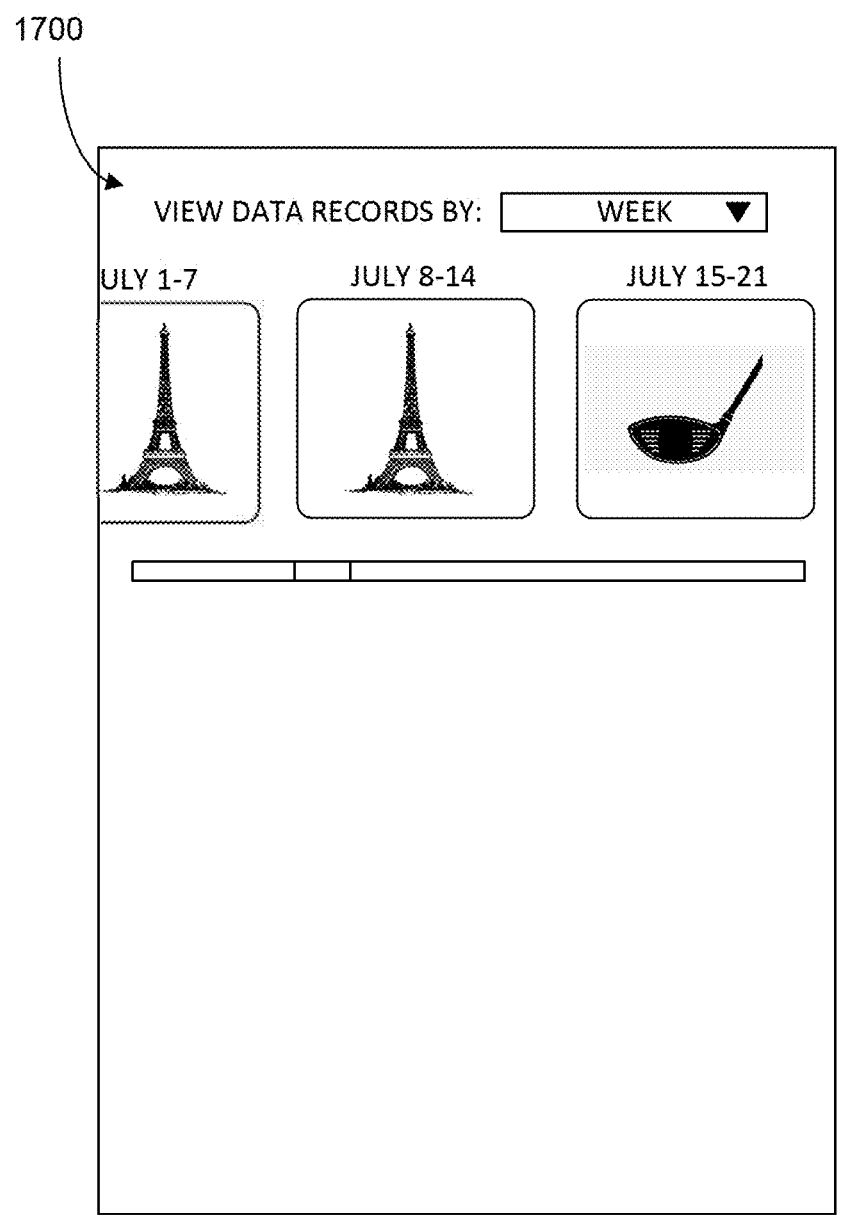
FIG. 17 is an example screen of a transfer record summary interface according to an embodiment.

An example transfer record summary interface 1700 is shown in FIG. 17. As can be seen, transfer record summary interface 1700 is similar to transfer record summary interface 1500, however the transfer records are grouped by week (rather than by month).

Figure 18:
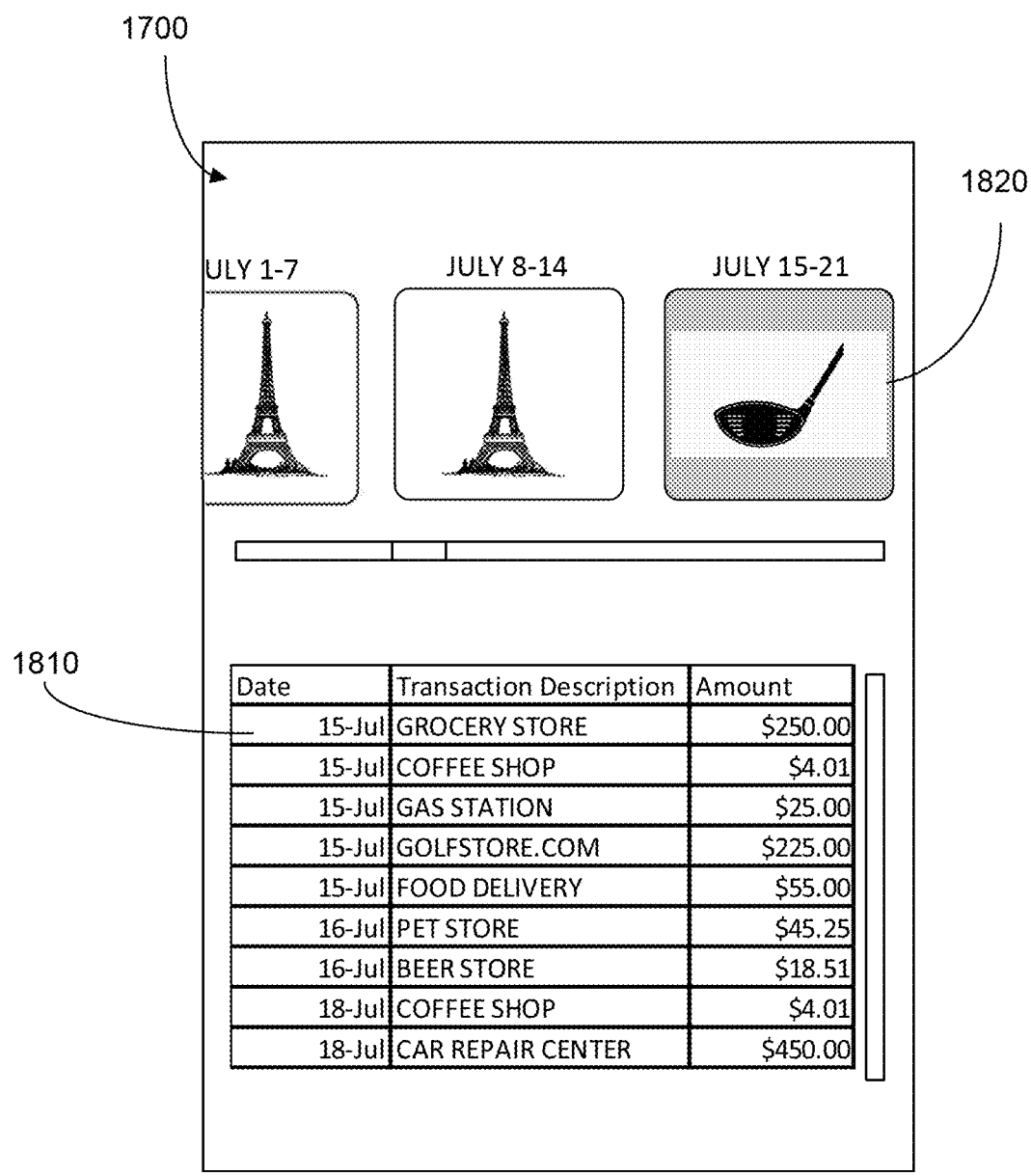
FIG. 18 is an example screen of a transfer record summary interface according to an embodiment.

Similar to embodiments described above, the user may select an image to view data for all transfer records within the group represented by the selected image. An example is shown in FIG. 18. As can be seen, a list of transfer records 1810 for all transfer records of the group represented by selected image 1820.

As can be seen in the list of transfer records 1810, the user had a number of large transactions. For example, on July 15 the user spent $250.00 at a grocery store and $225.00 on a website that relates to golf. On July 18, the user spent $450.00 at a car repair center. When selecting one or more representative transfer records for the group, the server 120 ignores the transfer record representing the transaction made at the grocery store and the transfer record made at the car repair center. As such, the representative transfer record is selected as the transfer record representing the transaction made at the website that relates to golf and the image 1820 associated with the representative transfer record is an image of a golf club.

Although in embodiments described above, selectable options are used to scroll through various groups and selectable options are used to select criteria of which to group transfer records by, alternative inputs may be used. For example, when transfer records are grouped by month (see for example transfer record summary interface 900 of FIG. 9), the user may wish to group transfer records by week. To adjust the criteria, the user may perform a zoom-in gesture via touch input on the display screen of the computing device 110. In response to the zoom-in gesture, the computing device 110 may send a signal to the server 120 indicating that the transfer records are to be grouped by week. Similarly, when transfer records are grouped by month (see for example transfer record summary interface 900 of FIG. 9), the user may wish to group transfer records by year. To adjust the criteria, the user may perform a zoom-out gesture via touch input on the display screen of the computing device 110. In response to the zoom-out gesture, the computing device 110 may send a signal to the server 120 indicating that the transfer records are to be grouped by year. Zoom-in and zoom-out gestures may switch or toggle between the various criteria. As mentioned, the various criteria may be daily (most specific), weekly, monthly, yearly (least specific). Each time a zoom-in gesture is identified, the transfer records may be sorted by the next-most specific criteria. Similarly, each time a zoom-out gesture is identified, the transfer records may be sorted by the next-least specific criteria.

Although transfer records are described as including a transfer descriptor that identifies a merchant or a location, those skilled in the art will appreciate that the transfer descriptor may additionally or alternatively include information regarding items purchased. For example, when transfer is initiated at a clothing store, the transfer descriptor may include a list of all items purchased at the clothing store. When the transfer record including the transfer descriptor that includes a list of all items purchased at the clothing store is identified as being the representative transfer record for the group, an image of one of the purchased items may be obtained via the API. For example, an image of a particular article of clothing that was purchase may be obtained via the API and set as the image associated with the representative transfer record.

In one or more embodiments, the user may create their own group of transfer records. For example, the server 120 may provide, to the computing device 110, all transfer records for a particular month. The user may manually select one or more of these transfer records as a group and may assign their own image to the manually selected group. Of course, the server 120 may obtain an image for the manually selected group similar to embodiments described above. In this manner, a user may create groups of transfer records associated with particular events such as vacations.

The methods described above may be modified and/or operations of such methods combined to provide other methods.

Furthermore, the description above generally describes operations that may be performed by a server and a client device in cooperation with one another. Operations that are described as being performed by the server may, instead, be performed by the client device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
obtain transfer records identifying value transfers associated with an account of a user, the transfer records including a transfer amount, a transfer date and a transfer descriptor;
group the transfer records based on predefined criteria;
within at least one group of the transfer records, identify one or more representative transfer records based at least on stored selection criteria;
obtain an image associated with at least one of the representative transfer records; and
send, via the communications module and to a computing device associated with the user, a transfer record summary interface, the transfer record summary interface including the image associated with the at least one representative transfer record.

2. The server of claim 1, wherein the image is obtained from one of the memory of the server, an application programming interface (API) and an image library stored on the computing device.

3. The server of claim 2, wherein the image is obtained from the image library stored on the computing device and the processor-executable instructions, when executed by the processor, further configure the processor to:
obtain permission to access the image library stored on the computing device; and
associate one of the images within the image library to one of the representative transfer records based on a comparison of the representative transfer record and metadata of the associated image.

4. The server of claim 1, wherein the processor-executable instructions, when executed by the processor, further configure the processor to:
receive, via the communications module and from the computing device, a signal indicating a selection of one of the images;
obtain all transfer records for the group represented by the selected image; and
send, via the communications module and to the computing device, all transfer records for the group represented by the selected image.

5. The server of claim 4, wherein the processor-executable instructions, when executed by the processor, further configure the processor to:
   tag at least one of the transfer records with a tag based on the transfer descriptor; and
   obtain the image based on the tag.

6. The server of claim 4, wherein the processor-executable instructions, when executed by the processor, further configure the processor to:
   for at least one representative transfer record, identify a merchant based on the transfer descriptor; and
   obtain the image associated with the at least one representative transfer record based at least on the identified merchant, the image including at least one of an image of the merchant, an image of a logo associated with the merchant, an image of an item offered by the merchant, an image based on a type of the merchant or an image based on a location of the merchant.

7. The server of claim 1, wherein the processor-executable instructions, when executed by the processor, further configure the processor to:
   determine that an image cannot be obtained for a particular representative transfer record;
   remove the particular representative transfer record as being the representative transfer record for a particular group of transfer records; and
   identify another transfer record as being representative for the particular group of transfer records based at least on the stored selection criteria.

8. The server of claim 1, wherein the transfer record summary interface includes an option to adjust the predefined criteria and the processor-executable instructions, when executed by the processor, further configure the processor to:
   receive, via the communications module and from the computing device, a signal indicating that the user has adjusted the predefined criteria;
   group transfer records based on the updated predefined criteria;
   within at least one group of transfer records, identify one or more transfer records as being representative based at least on the stored selection criteria;
   for at least one representative transfer record that does not have an associated image, obtain an image; and
   send, via the communications module and to the computing device associated with the user, an updated transfer record summary interface, the updated transfer record summary interface including the image associated with the at least one representative transfer record.

9. The server of claim 1, wherein the predefined criteria includes a particular period of time.

10. The server of claim 1, wherein the stored selection criteria includes at least one of the transfer amount or the transfer descriptor.

11. A method comprising:
    obtaining transfer records identifying value transfers associated with an account of a user, the transfer records including a transfer amount, a transfer date and a transfer descriptor;
    grouping the transfer records based on predefined criteria;
    within at least one group of the transfer records, identifying one or more representative transfer records based at least on stored selection criteria;
    obtaining an image associated with at least one of the representative transfer records; and
    sending, via a communications module and to a computing device associated with the user, a transfer record summary interface, the transfer record summary interface including the image associated with the at least one representative transfer record.

12. The method of claim 11, wherein the image is obtained from one of a memory of a server, an application programming interface (API) and an image library stored on the computing device.

13. The method of claim 12, wherein the image is obtained from the image library stored on the computing device and the method further comprises:
    obtaining permission to access the image library stored on the computing device; and
    associating one of the images within the image library to one of the representative transfer records based on a comparison of the representative transfer record and metadata of the associated image.

14. The method of claim 11, further comprising:
    receiving, via the communications module and from the computing device, a signal indicating a selection of one of the images;
    obtaining all transfer records for the group represented by the selected image; and
    sending, via the communications module and to the computing device, all transfer records for the group represented by the selected image.

15. The method of claim 14, further comprising:
    tagging at least one of the transfer records with a tag based on the transfer descriptor; and
    obtaining the image based on the tag.

16. The method of claim 14, further comprising:
    for at least one representative transfer record, identifying a merchant based on the transfer descriptor; and
    obtaining the image associated with the at least one representative transfer record based at least on the identified merchant, the image including at least one of an image of the merchant, an image of a logo associated with the merchant, an image of an item offered by the merchant, an image based on a type of the merchant or an image based on a location of the merchant.

17. The method of claim 11, further comprising:
    determining that an image cannot be obtained for a particular representative transfer record;
    removing the particular representative transfer record as being the representative transfer record for a particular group of transfer records; and
    identifying another transfer record as being representative for the particular group of transfer records based at least on the stored selection criteria.

18. The method of claim 11, wherein the transfer record summary interface includes an option to adjust the predefined criteria and the method further comprises:
    receiving, via the communications module and from the computing device, a signal indicating that the user has adjusted the predefined criteria;
    grouping transfer records based on the updated predefined criteria;
    within at least one group of transfer records, identifying one or more transfer records as being representative based at least on the stored selection criteria;
    for at least one representative transfer record that does not have an associated image, obtaining an image; and
    sending, via the communications module and to the computing device, an updated transfer record summary interface, the updated transfer record summary interface including the image associated with the at least one representative transfer record.

19. The method of claim 11, further comprising:
wherein the stored selection criteria includes at least one of the transfer amount and the transfer descriptor.

20. A non-transitory computer readable storage medium comprising computer-executable instructions which, when executed, configure a processor to:
obtain transfer records identifying value transfers associated with an account of a user, the transfer records including a transfer amount, a transfer date and a transfer descriptor;
group the transfer records based on predefined criteria;
within at least one group of the transfer records, identify one or more representative transfer records based at least on stored selection criteria;
obtain an image associated with at least one of the representative transfer records; and
send, to a computing device associated with the user, a transfer record summary interface, the transfer record summary interface including the image associated with the at least one representative transfer record.

* * * * *